UNITED STATES PATENT OFFICE.

EMIL POLLACSEK, OF BUDAPEST, AUSTRIA-HUNGARY.

PROCESS OF DESULFURIZING FURNACE-GASES.

SPECIFICATION forming part of Letters Patent No. 709,358, dated September 16, 1902.

Application filed March 10, 1902. Serial No. 97,621. (No specimens.)

*To all whom it may concern:*

Be it known that I, EMIL POLLACSEK, a subject of the Emperor of Austria-Hungary, residing at Budapest, in the Empire of Austria-Hungary, have invented certain new and useful Improvements in Processes of Desulfurizing Furnace-Gases; and I do hereby declare the following to be a full, clear, and exact description of the invention, such as will enable others skilled in the art to which it appertains to make and use the same.

The present invention has for its object to prevent the atmospheric air of cities and industrial centers from becoming contaminated by the admixture of oxid of sulfur and oxid of carbon which in consequence of the working of furnaces hitherto in use are contained in the smoke and waste gases emanating from the furnaces.

In order to render furnace-gases innocuous in the said respect, the present invention consists in a particular way of employing lime, which has been known as a desulfurizing agent for furnace-gases. Hitherto this agent has been utilized either by adding it to the coal in the shape of pulverized lime or by forming disintegrated coal into bricks by the aid of lime-milk. However, none of these methods of application of lime affords the possibility of entirely freeing the furnace-gases from the oxids of sulfur.

I have succeeded in solving this important problem in a satisfactory manner by employing lime in such conditions which during the working of the furnace produce the formation of a filter for the gases of combustion, the said filter absorbing the sulfur contained in these gases by constituting a wall which is not easily fusible and consists of slag rich in lime of a spongy porous structure. For this purpose it is not sufficient to prepare a mass by mixing lime-milk and a fuel rich in ashes. A mass of this description would crack at the first action of heat and then continuously disintegrate. On the contrary, it is required that the mass consisting of lime and a fuel rich in ashes be mixed with easily-burning fuel and with less easily-burning fuel distributed as uniformly as possible, the first serving by burning out rapidly to produce the porosity required for the dilatation of the mass under the influence of the increasing temperature, the latter for securing by burning out more slowly the porosity during the scorification and in the slag itself. In this manner a layer of slag of sponge-like porosity is obtained.

I have found that the problem may be solved in practice by mixing as uniformly as possible lime-milk containing the required proportion of lime with sawdust, representing the easily-combustible component, not-caking fuel, representing the less-combustible component, and brown coal or peat, representing the component which furnishes principally ashes. Moreover, some caking fuel is advantageously added in order to impart a certain degree of toughness to the mass.

Experiments carried on on a large scale and for a period of considerable duration have proved that the following combination is a very suitable one, viz: from ten to fifteen parts, by weight, of sawdust, from thirty to thirty-five parts, by weight, of not-caking fuel, (coke, anthracite, coal,) from twenty to twenty-five parts, by weight, of caking fuel, from thirty to thirty-five parts, by weight, of peat. These substances are mixed with six to twenty parts, by weight, of caustic lime, as may be required, tempered with a quantity of water equal to the weights of the combustible material taken together. The mass, mixed as intimately and uniformly as possible, is molded in the shape of plates, bricks, &c., and exposed to the air, whereby the caustic lime is converted into carbonate of lime, which cements the parts of fuel together.

The plates, bricks, &c., are disposed either in layers alternating with the fuel or they are arranged behind the fuel.

By the action of the fire the mass is converted into a sponge-like porous slag wall, which in consequence of its considerable tenor in lime combines absolutely with the sulfur of the furnace-gases passing through the same and on the other side enforces an intimate mixture of the furnace-gases with the accompanying unconsumed air, whereby solid parts of coal, carbonic oxid, and products of smouldering and of distillation contained in those gases are caused to be consumed. The result is that the chimney-stacks discharge into the atmospheric air the furnace-gases essentially free of sulfurous acid, carbonic oxid, and soot.

I claim as my invention—

1. A method for desulfurizing furnace-gases, which consists in passing the gases through a filter arranged adjacent to the fuel-plates of the furnace and formed by the action of the gases upon a mass consisting of lime, sawdust, not-caking fuel, caking fuel and peat.

2. A method for desulfurizing furnace-gases which consists in passing the gases through a mass consisting of caustic lime, an easily-combustible component, a less-combustible component, and peat.

3. A method for desulfurizing furnace-gases which consists in passing the gases through a sponge-like material formed by the action of the gases upon a mass consisting of ten to fifteen parts by weight of sawdust, thirty to thirty-five parts by weight of not-caking fuel, twenty to twenty-five parts by weight of caking fuel, thirty to thirty-five parts by weight of peat and six to twenty parts by weight of caustic lime.

4. A method for desulfurizing furnace-gases which consists in passing the gases through a filter arranged adjacent to the fuel-plates and formed by the action of the gases upon a mass consisting of caustic lime, an easily-combustible component, a less-combustible component, caking fuel, and peat.

In testimony that I claim the foregoing as my invention I have signed my name in presence of two subscribing witnesses.

EMIL POLLACSEK.

Witnesses:
FRANK DYER CHESTER,
T. LOGNOIDIO.